US011788891B2

(12) United States Patent
Kim et al.

(10) Patent No.: US 11,788,891 B2
(45) Date of Patent: Oct. 17, 2023

(54) METHOD AND SYSTEM FOR ACTIVE LINE SCAN IMAGING

(71) Applicant: The United States of America, as represented by the Secretary of Agriculture, Washington, DC (US)

(72) Inventors: Moon S. Kim, Ashton, MD (US); Diane E. Chan, Odenton, MD (US); Jianwei Qin, Ellicott City, MD (US); Insuck Baek, Burtonsville, MD (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 17/836,310

(22) Filed: Jun. 9, 2022

(65) Prior Publication Data

US 2022/0397457 A1 Dec. 15, 2022

Related U.S. Application Data

(60) Provisional application No. 63/209,663, filed on Jun. 11, 2021.

(51) Int. Cl.
*G01J 3/28* (2006.01)
*G01J 3/02* (2006.01)

(52) U.S. Cl.
CPC .............. *G01J 3/2823* (2013.01); *G01J 3/021* (2013.01); *G01J 3/024* (2013.01); *G01J 3/0237* (2013.01)

(58) Field of Classification Search
CPC ........ G01J 3/28; G01J 3/02; G01J 3/14; G01J 3/18; G01J 3/2823; G01J 3/021; G01J 3/0237; G01J 3/024; G01J 3/0289; G02B 26/108
See application file for complete search history.

(56) References Cited

U.S. PATENT DOCUMENTS

| 9,395,293 B1 * | 7/2016 | Acosta ................. G01N 21/255 |
| 2005/0274913 A1 | 12/2005 | Sawada |
| 2011/0292374 A1 | 12/2011 | Schulenburg et al. |

FOREIGN PATENT DOCUMENTS

| KR | 1020200102899 A | 9/2020 |
| KR | 1020210059645 A | 5/2021 |
| KR | 102259421 B1 | 6/2021 |

OTHER PUBLICATIONS

International Search Report, dated Oct. 4, 2022.

* cited by examiner

*Primary Examiner* — Abdullahi Nur
(74) *Attorney, Agent, or Firm* — Robert Jones; John Fado

(57) ABSTRACT

A line scan imaging system scans a targeted inspection area and gathers reflectance and fluorescence data. The inspection system comprises at least a rotatable/pivotable mirror-faced triangular prism, a line illumination source, and a line scan hyperspectral camera. The prism has a mirrored camera face and a mirrored illumination face. In operation, as the prism rotates, the camera instantaneous field of view (IFOV) and the projected illumination line converge at a nadir convergence scan line so that the hyperspectral camera receives line scan data from the nadir convergence scan line as the nadir convergence scan line traverses an inspection area.

19 Claims, 7 Drawing Sheets

METHOD AND SYSTEM FOR ACTIVE LINE SCAN IMAGING

REFERENCE TO RELATED APPLICATIONS

This application claims the benefit of U.S. Provisional Application No. 63/209,663, filed Jun. 11, 2021, which is incorporated herein by reference in its entirety.

FIELD OF THE INVENTION

The disclosed subject matter relates to multiple embodiments of a line scan inspection system. The system works by illuminating a targeted line scan area and simultaneously focusing an instantaneous field of view (IFOV) of a camera on the targeted line area. Specifically, the subject matter is preferably directed to a handheld system comprising at least a line illumination source, a line-scan hyperspectral camera, and a mirror-faced triangular prism. The system is configured so that as the prism rotates, the camera IFOV and an illumination line converge at a nadir convergence scan line. As the nadir convergence scan line is illuminated, the camera receives fluorescence and reflectance data along the illuminated convergence scan line.

BACKGROUND OF THE INVENTION

Line scan inspection systems are currently used for the safety and quality inspection of foods, agricultural commodities, and bacterial culture monitoring for medical applications. Handheld line scan inspection devices give inspectors a degree of versatility and flexibility that improves both the speed and quality of the inspection process. The US Department of Agriculture (USDA) has previously patented handheld imaging devices for area-based imaging, including U.S. Pat. No. 8,310,544 to Kim et al. (hereinafter "Kim"), and U.S. Pat. No. 8,159,525 to Park et al. (hereinafter "Park"). The system disclosed by Kim employs a fluorescence imaging technique designed as an inexpensive inspection aid for cleaning and sanitation inspection in commercial food service and processing environments, regulatory inspection, and food safety audits conducted by (among other organizations) the US Army. The system disclosed by Park is designed to be a portable reflectance-based imager to detect fecal contamination on poultry carcasses for use in poultry processing facilities.

The need continues to exist for smaller, lighter, more effective, and more efficient handheld line-scan systems. The system described herein comprises a more compact and more capable system with improved efficiency and greater target illumination capability.

SUMMARY OF THE INVENTION

This disclosure is directed to multiple embodiments of a line scan illumination inspection system. The inspection system comprises at least a rotatable/pivotable mirror-faced triangular prism, a line illumination source, and a line scan hyperspectral camera. The prism has a mirrored camera face and a mirrored illumination face. The hyperspectral camera is positioned so that the camera face of the prism is within an instantaneous field of view (IFOV) of the camera, and the line illumination source is positioned so that the illumination source's projected illumination is reflected by the illumination face of the prism. In operation, as the prism rotates, the camera IFOV and the projected illumination are directed by the rotating prism to converge at a nadir convergence scan line so that the hyperspectral camera receives line scan data from the nadir convergence scan line.

BRIEF DESCRIPTION OF THE DRAWINGS

Note that assemblies/systems in some of the FIGS. may contain multiple examples of essentially the same component. For simplicity and clarity, in some FIGS., only a few of the example components may be identified with a reference number. Unless otherwise specified, other non-referenced components with essentially the same structure as the exemplary component should be considered to be identified by the same reference number as the exemplary component. Also note that none of the figures are intended to be precisely to scale.

FIG. 2 shows a line illumination source's projected illumination 24 and an optical path hyperspectral camera IFOV 26 as the projected illumination 24 and the camera IFOV 24 converge at the nadir convergence scan line 28.

FIG. 4 shows the components in the handheld configuration, the described components are generally common to all of the systems 10, 40, 70, 80 described herein.

DETAILED DESCRIPTION OF PREFERRED EMBODIMENTS

Figure 1C:
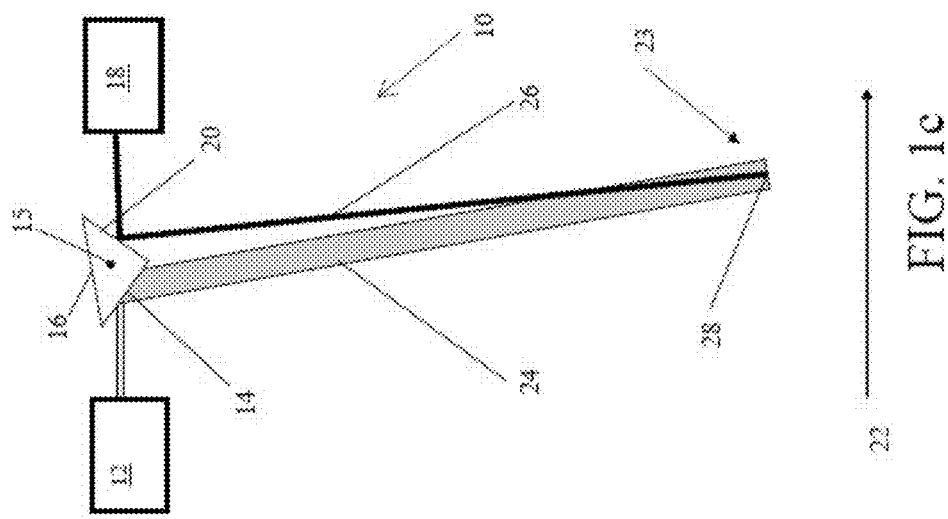
FIGS. 1a-1c show a schematic view of "hammerhead" embodiment 10 of the scanning sequence of the inspection system described herein.
Figure 1B:
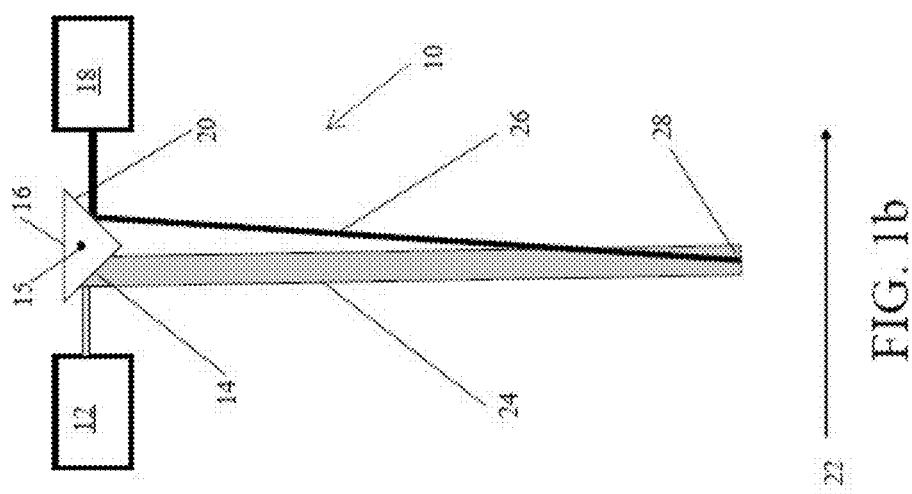
Figure 1A:
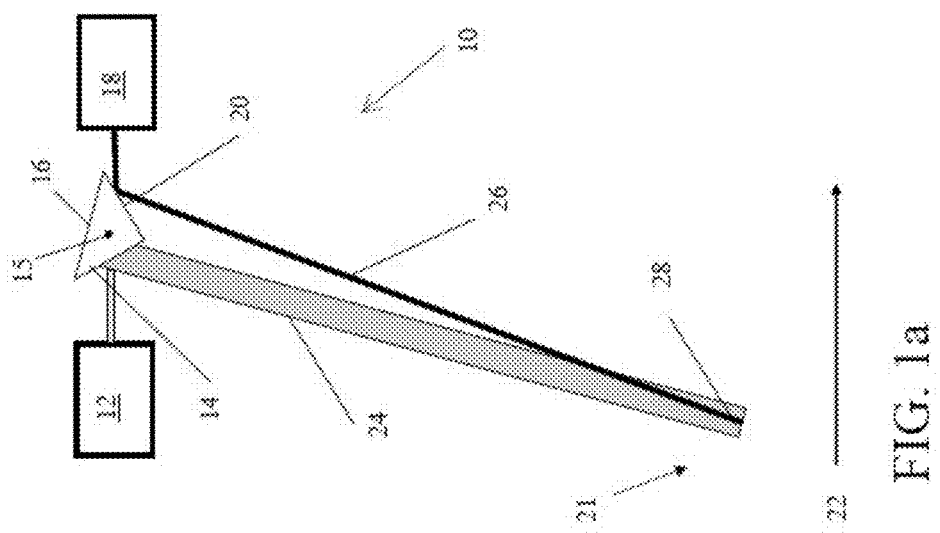

FIGS. 1a-c disclose a first "hammerhead" embodiment 10 of the active line scan imaging system. As best shown in FIGS. 1a-1c, an illumination projection source 12 projects a selected bandwidth of light (an "illumination projection" 24) on a mirrored "illumination face" 14 of a rotatable mirror-faced triangular prism 16. For the purposes of this disclosure, this mirrored face 14 of the prism 16 is designated as the "illumination face".

The system 10 further comprises a line scan hyperspectral camera 18. The camera 18 is directed so that a mirrored face 20 of the prism 16 is within the camera's 18 instantaneous field of view (IFOV). For the purposes of this disclosure, this mirrored face 20 of the prism 16 is designated as the "camera face". The camera face 20 of the prism 16 is perpendicular to the illumination face 14 of the prism 16.

Figure 2:
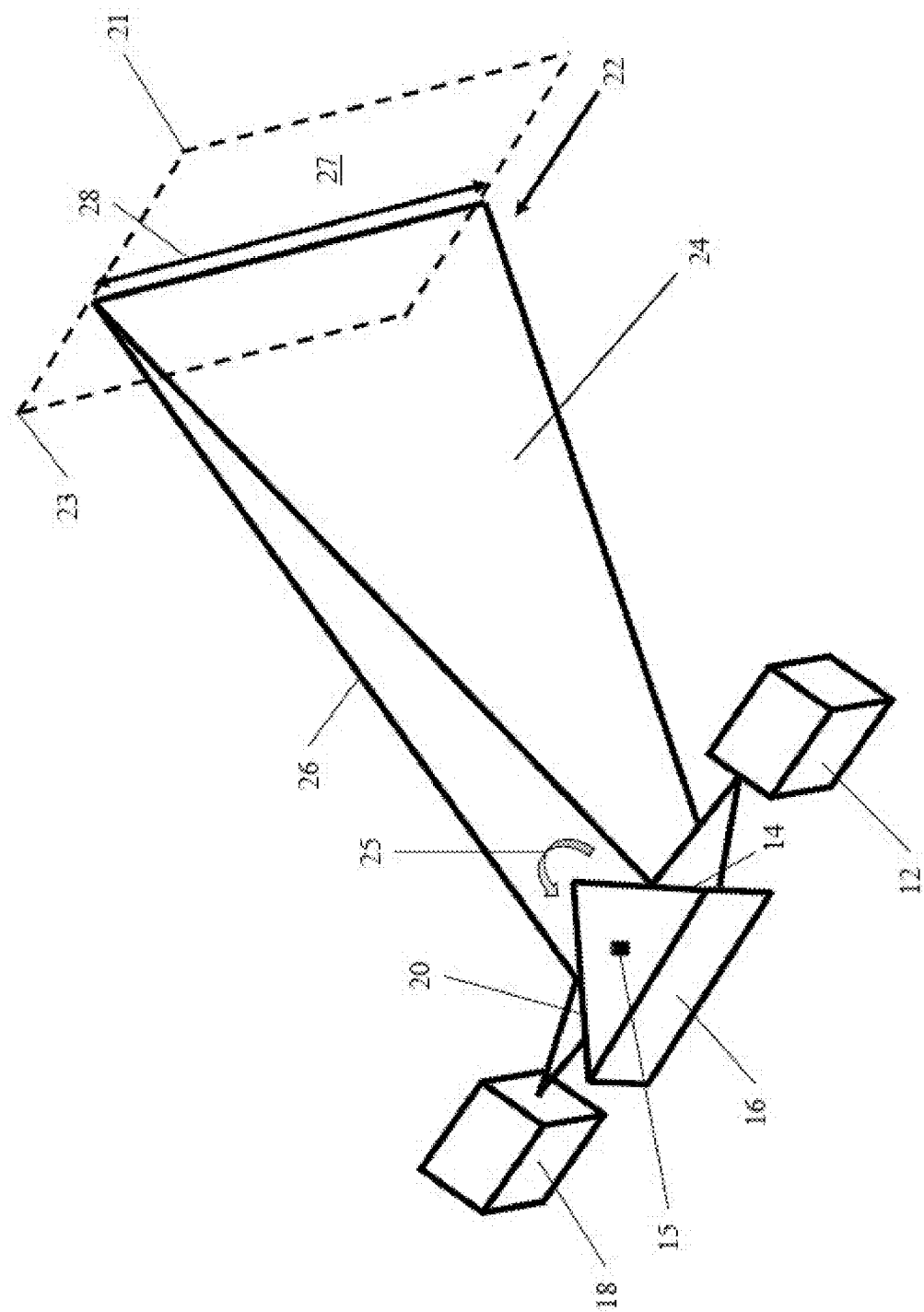
FIG. 2 is an isometric schematic of the hammerhead embodiment as shown in FIG. 1B.

FIG. 2 shows an isometric schematic of the hammerhead embodiment 10 (in the position shown in FIG. 1B). In FIG. 2, the illumination projection 24 is shown as having a generally triangular form. The camera IFOV 26 is also shown in FIG. 2. The illumination projection 24 and the camera IFOV 26 converge (and overlap) at a nadir convergence scan line 28.

As best shown in FIGS. 1a-1c and 2, at the beginning of an operational inspection cycle, the nadir convergence scan line 28 is in a beginning position 21, and moves in the direction of the arrows 22, 25 to an end position 23. The mirror-faced prism 16 then then reverses rotational direction and the nadir convergence scan line 28 sweeps back in the opposite direction of the arrows 22, 25 to the original start position 21 to complete an operational inspection cycle.

For the purposes of this disclosure, a "sweep cycle" or an "operational inspection cycle" is defined as a system 10, 40, 70, 80 sweeping the nadir convergence scan line 28 from a beginning position 21 to an end position 23, and then reversing direction and sweeping the nadir convergence scan line 28 back to the beginning position 21. Further, for the purposes of this disclosure, an "inspection area" 27 comprises the area that the nadir convergence scan line 28 traverses during an operational inspection cycle. In operation, an "inspection area" 27 may comprise a continuously moving area that moves as the handheld system 40 moves so that the "inspection area" 27 for the initial part of an operational inspection cycle may be different than the "inspection area" 27 for the return portion of the cycle.

Essentially, as shown in FIGS. 1a-1c and 2, in operation, an operational inspection sweep cycle begins with the system 10 in the beginning position 21 shown in FIG. 1a. As the mirror-faced prism 16 rotates about a central axis 15, the nadir convergence line 28 moves in the direction of the arrows 22, 25. As the nadir convergence line 28 is illuminated, the hyperspectral camera 18 receives fluorescence and reflectance data generated along the illuminated nadir convergence scan line 28. As the illuminated nadir convergence scan line 28 sweeps across a targeted inspected area 27, the system 10 receives and processes fluorescence and reflectance inspection data in the targeted inspection area 27. When the nadir convergence scan line 28 reaches an end position 23 (shown in at least FIG. 1c), the mirror-faced prism 16 reverses its course so that the nadir convergence scan line 28 is swept back in a direction opposite of the arrows 22, 25. When the nadir convergence scan line 28 reaches the original beginning position 21, the operational inspection cycle is complete. The cycle is then repeated as required or until the inspection terminates.

Figure 3C:
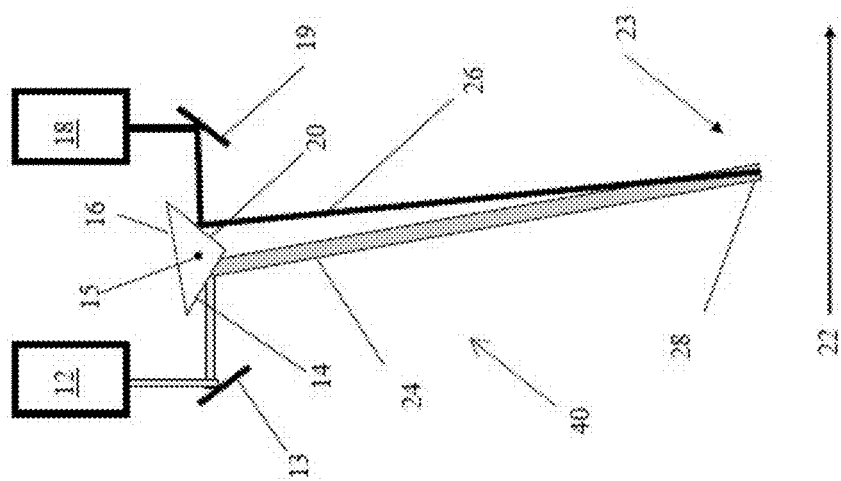
FIG. 3a-3c show a schematic view of a preferred "handheld" embodiment 40.
Figure 3B:
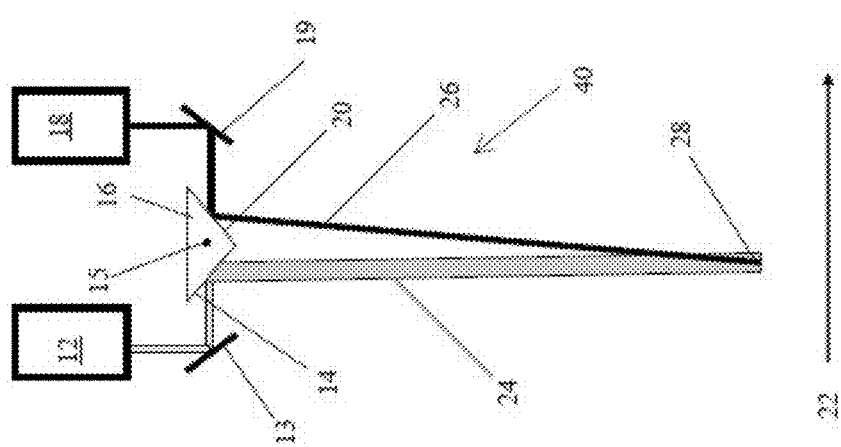
Figure 3A:
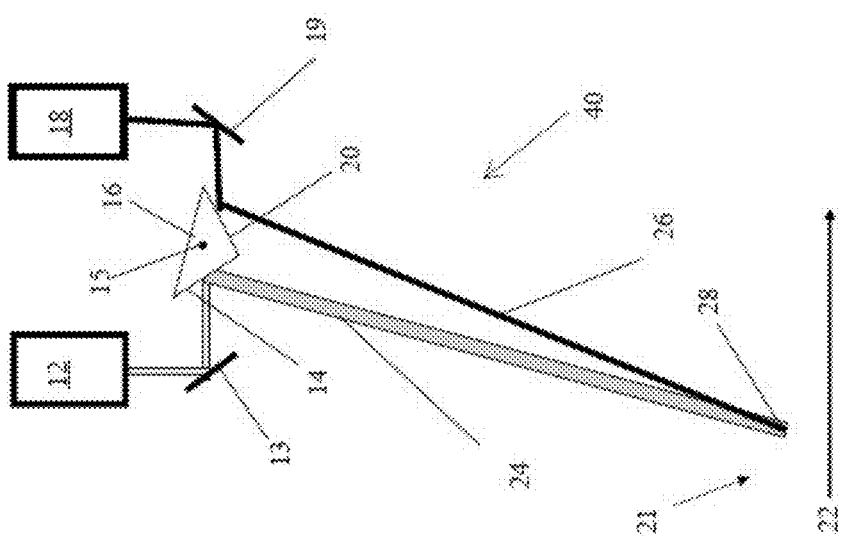
Figure 4:
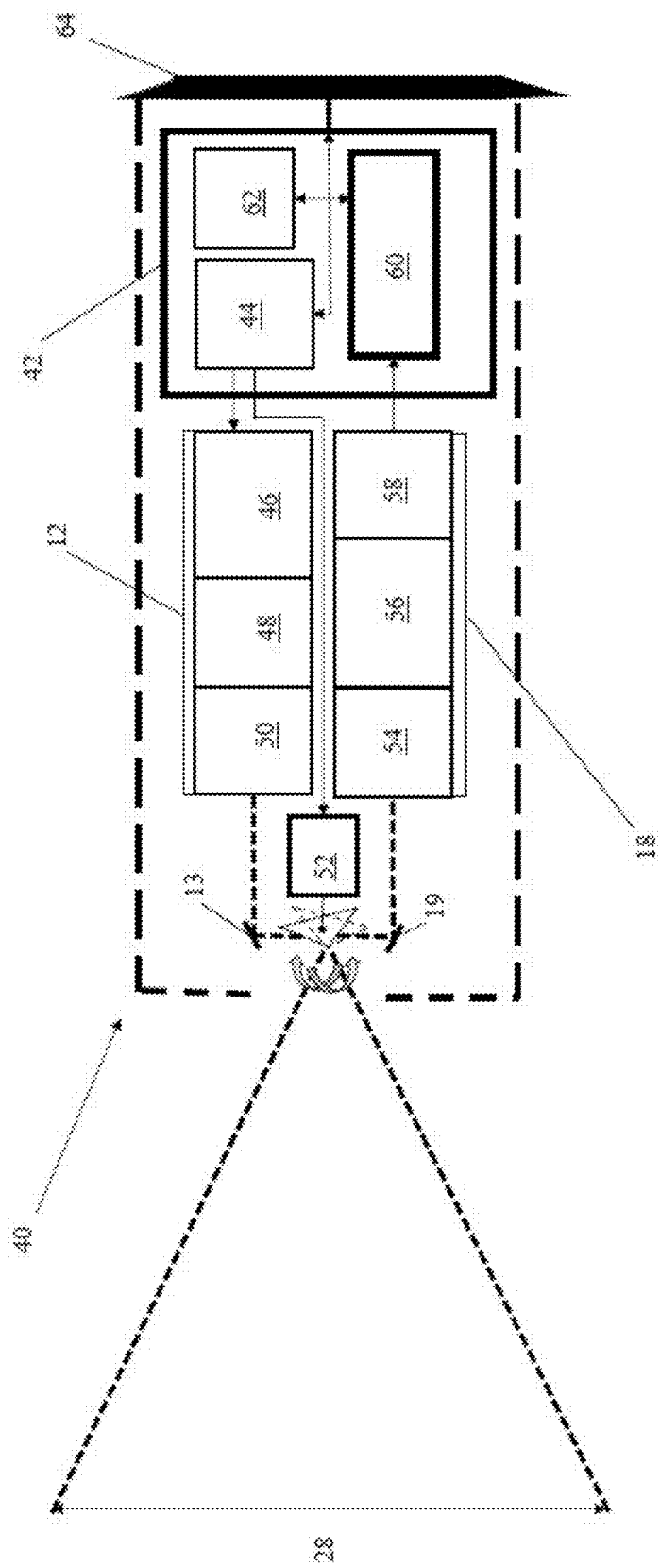
FIG. 4 is a schematic showing the primary electronic components of the handheld embodiment 40. Although

FIGS. 3a-3c show a preferred embodiment of a handheld system 40. Although the inspection cycle described supra is directed to the hammerhead embodiment 10, the described cycle is fully applicable to the handheld system 40 as well. The handheld embodiment 40 (per FIG. 3a-3c) is similar to the hammerhead embodiment 10 (per FIG. 1a-1c), however, in the handheld embodiment 40, the illumination light source 12 and the hyperspectral camera 18 are arranged in tandem (rather than parallel) with the rotating mirror-faced prism 16 (as best shown in FIG. 4). This arrangement 40 is enabled through the use of angular reflective mirrors 13, 19 which allow the system 40 to have a narrower and more compact handheld design.

Figure 5:
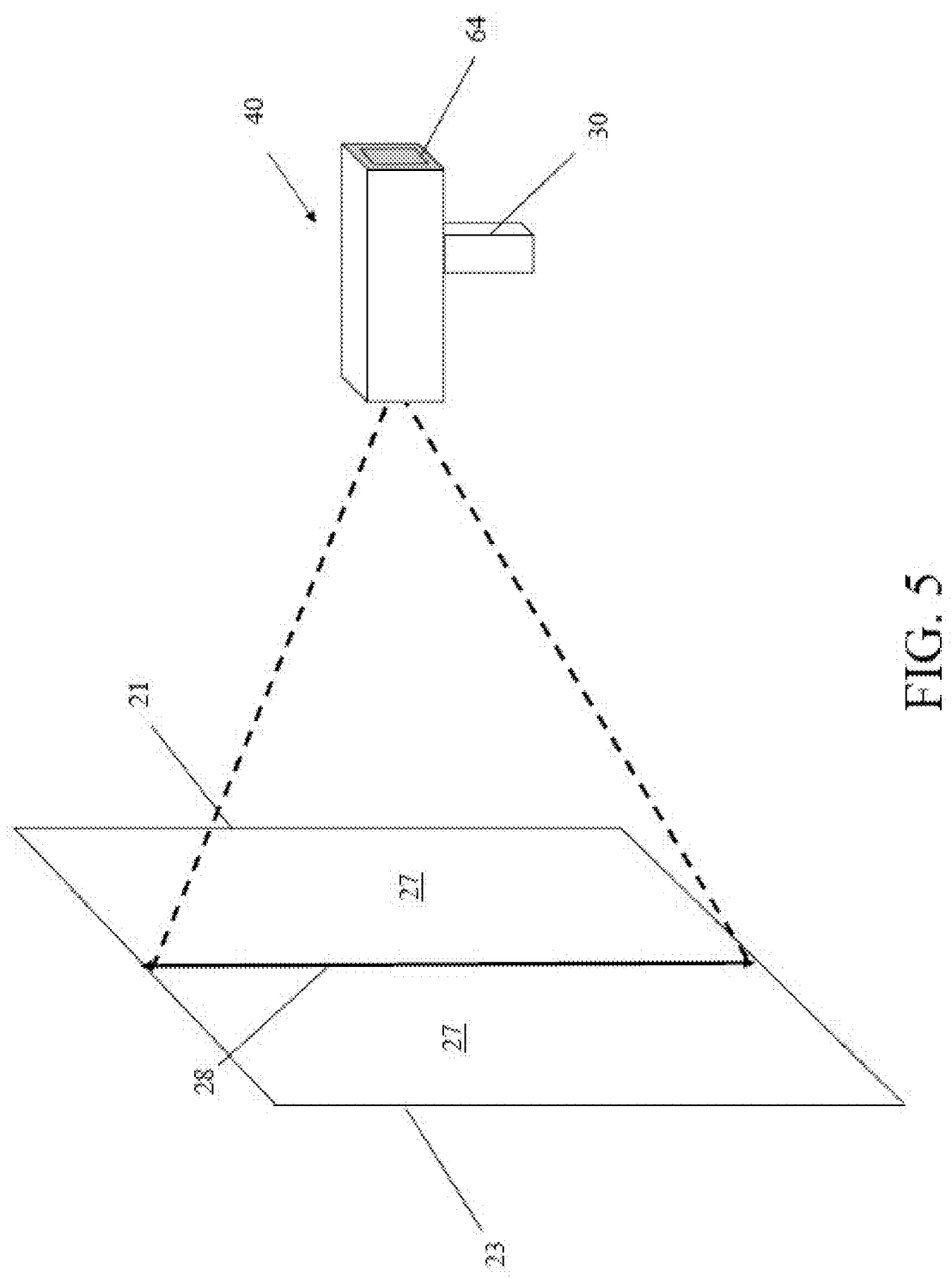
FIG. 5 shows a perspective view of the handheld embodiment 40 in the position shown in FIG. 3b, as the nadir convergence line 28 sweeps across an inspection area 27.

For the purposes of this disclosure, a "handheld device" is a device fully operable and useable by a single operator. A handheld device is sized so that the handheld device is compact and light enough to be carried and maneuvered by hand by a single operator via a hand grip 30. In the preferred embodiment, the "hand grip" comprises a pistol-type grip 30, as shown in FIG. 5.

As shown in FIGS. 3a-3c, in operation, in the handheld embodiment 40, as the mirror-faced prism 16 rotates about its central axis 15, illumination from the illumination source 12, and an optical path of/from the camera IFOV, are reflected about 90° from the angular reflective mirrors 13, 19 to the mirrored prism faces 14, 20. As described supra with regard to the hammerhead embodiment 10, the line-scan illumination 24 and the camera IFOV 26 converge at a nadir convergence scan line 28 so that the camera 18 receives fluorescence and/or reflectance data generated along the illuminated nadir convergence scan line 28. As best shown in FIG. 5, as the illuminated nadir convergence scan line 28 sweeps across an inspected area 27 from the beginning position 21, the system 40 receives and processes inspection data in the inspection area 27. At the end point 23 (shown in FIG. 3c), the mirror-faced prism 16 reverses its course so that the nadir convergence scan line 28 is swept back in a direction opposite to the direction of the arrows 22, 25 to the original start point 21.

In the preferred embodiment, the distance between the mirror-faced prism 16 and the nadir scan line 28 is about 30 centimeters, and the length of the nadir convergence scan line 28 is about 50 centimeters. In alternative embodiments, the length of the scan line 28, the distance from the prism 16 to the scan line 28, and the size of the inspection area 27, may vary based on the purpose and design parameters of the various systems 10, 40, 70, 80.

FIG. 4 shows the primary internal components of the handheld embodiment 40. Although the configuration may be modified, the components shown in FIG. 4 are also present in the other embodiments 10, 70, 80 (as applicable). In the preferred embodiment, a processor/controller 42 functionally controls the system 40. In the preferred embodiment, the controller 44 comprises at least a single board microcontroller such as an ARDUINO controller (manufactured by Arduino LLC originally of Ivrea, Italy) or a similarly capable controller 44. Note that—although the ARDUINO is used in the preferred embodiment, other controllers (preferably single board controllers) should be considered within the scope of the invention.

As shown in FIG. 4, the Arduino 44 is in communication with the light emitting diode (LED) driver circuit 46—which abuts and is in communication with ultraviolet (UV) LEDs 48. In alternative embodiments, other (non-UV) LEDs may be used based on the requirements of a specific device purpose. The LEDs 48 are projected through a light shaping diffuser 50. The Arduino 44 also communicates with a micromotor 52 which controls the mirror-faced prism 16. The line-scan scanning process is described in greater detail supra. The combination of the LED driver circuit 46, the UV LEDs 48, and the light-shaping diffuser 50—comprise the illumination light source 12.

As the mirror-faced prism 16 rotates, the IFOV of a wide-angle lens 54 is focused on the area illuminated 24 by the illumination light source 12 so that reflectance and/or fluorescence data is directed into (and collected by) the wide angle lens 54. In a preferred embodiment, the lens is a C-mount objective lens (F1.9 35 mm compact lens, Schneider Optics, Hauppauge, N.Y., USA). The wide-angle lens 54 communicates the data to a solid block monolithic spectrograph 56. In a preferred embodiment, the spectrograph comprises a visible and near-visible infrared imaging spectrograph (Headwall Photonics, Fitchburg, Mass., USA)—which then communicates the data to a board-level CMOS detector 58. The wide-angle lens 54, and the solid block monolithic spectrograph 56, are mounted on a board-level CMOS detector 58 or (alternatively) on an electron-multiplying charge-coupled device (EMCCD) camera (Luca R DL-604M, Andor Technology, South Windsor, Conn., USA). Collectively, these components comprise the hyperspectral camera 18.

The reflectance and fluorescence data collected by the hyperspectral camera 18 is then communicated to a data processor 60. In the current preferred embodiment, the processor 60 comprises a Windows 10 LabVIEW data processor 60, although other processors should be considered within the scope of the invention. Data from the processor 60 is selectively transferred to solid state storage 62. Real-time results of the scan as well as user input is communicated to and from the user via a touchscreen monitor/interface 64.

In a preferred embodiment, the selected illumination bandwidth comprises light in the ultraviolet (UV) bandwidth. In alternative embodiments, the bandwidth may further include any one or a combination of: near infrared, infrared, short wave infrared, and/or visible light ranges. Specific sub-ranges within the cited bandwidths should also be considered within the scope of the invention.

Figure 6:
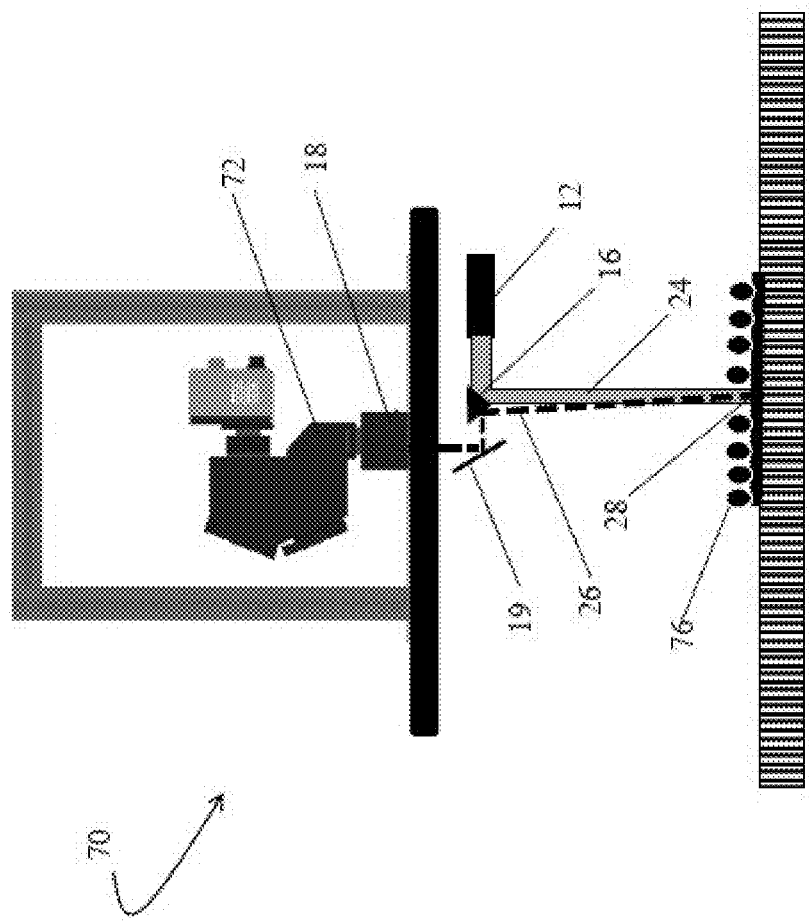
FIG. 6 is a "a compact hybrid conveyor" embodiment 70 of the system disclosed herein.

FIG. 6 shows a compact hybrid conveyor embodiment 70. The hybrid conveyor system 70 functions similarly to the previously described systems 10, 40, however the illumination projection source 12 is positioned separately from the body 72 of the system 70 (as with the hammerhead embodiment 10), but the hybrid system 70 also utilizes an angular reflective mirror 19 to direct the camera IFOV 26 (as with the handheld embodiment 40) to the nadir convergence scan line 28. Additionally, rather than a handheld manually directed illumination system 40, the hybrid conveyor system 70 relies on a conveyor 74 to move inspected items 76 through the nadir convergence line 28. Although the hybrid system 70 is less versatile than the handheld system 40, the hybrid system 70 may be simpler and more precise than the handheld system 40 in some applications.

Figure 7:
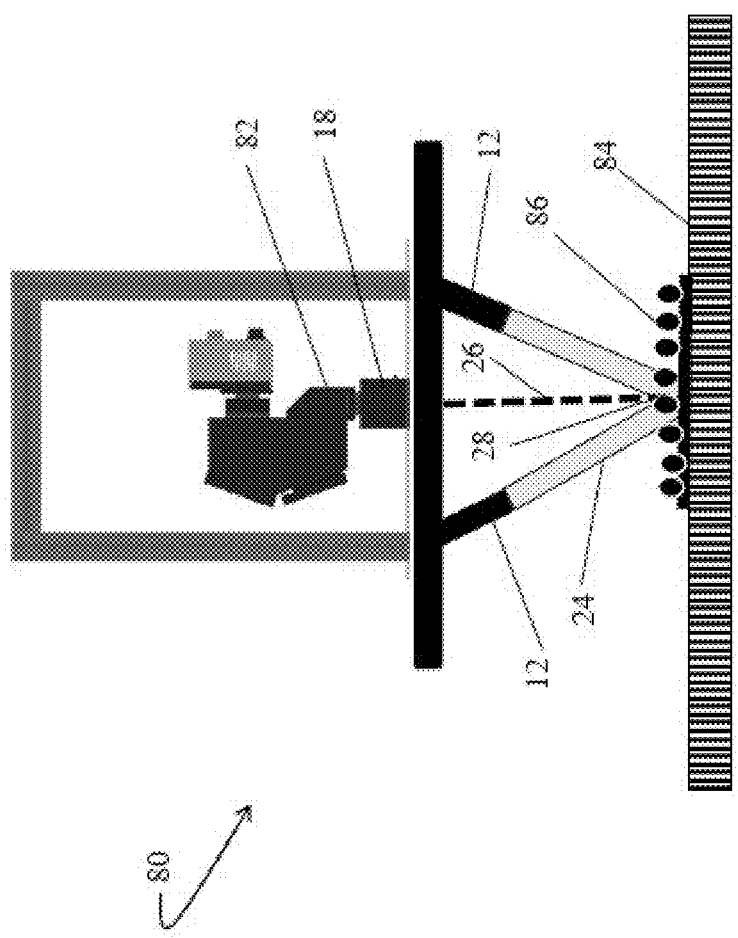
FIG. 7 is a "direct illumination conveyor" embodiment 80 of the system disclosed herein.

FIG. 7 shows a direct illumination conveyor embodiment 80. The direct illumination system 80 functions similarly to the previously described hybrid conveyor system 70. Like the hybrid conveyor system 70, the components of the direct illumination system 80 are in a fixed position and the items to be inspected 86 are conveyed through the nadir convergence line 28 via a conveyor 84. Also similar to the hybrid conveyor system 70, the illumination source 12 is separated from the body of the system 82. However, in the direct illumination conveyor system 80, the illumination projection 24 and the camera IFOV 26 are directly focused on the items to be inspected 86 so that the mirror-faced prism 16 is eliminated. The direct illumination system 80 is another level of magnitude less complex than the hybrid system 70—primarily because the rotating mirror-faced prism 16 is completely unnecessary (and therefore eliminated), and the direct illumination configuration allows more flexibility in the number and characteristics of the illumination sources 12.

For the foregoing reasons, it is clear that the subject matter described herein provides multiple innovative line scan inspection systems 10, 40, 70, 80 that may be used in a wide range of applications. The described systems may be modified in multiple ways and applied in various technological applications. For example, although the system preferably sweeps in a lateral (horizontal) direction, the sweep direction could be oriented vertically as required for a specific application. The disclosed method and apparatus may be modified and customized as required by a specific operation or application, and the individual components may be modified and defined, as required, to achieve the desired result.

Although the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

The amounts, percentages and ranges disclosed in this specification are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the implied term "about." If the (stated or implied) term "about" precedes a numerically quantifiable measurement, that measurement is assumed to vary by as much as 10%. Essentially, as used herein, the term "about" refers to a quantity, level, value, or amount that varies by as much 10% to a reference quantity, level, value, or amount. Accordingly, unless otherwise indicated, the numerical properties set forth in the following specification and claims are approximations that may vary depending on the desired properties sought to be obtained in embodiments of the present invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein. The term "an effective amount" as applied to a component or a function excludes trace amounts of the component, or the presence of a component or a function in a form or a way that one of ordinary skill would consider not to have a material effect on an associated product or process.

What is claimed is:

1. An imaging system comprising:
a rotatable mirror-faced triangular prism, the prism having a mirrored camera face, and a mirrored illumination face;
a hyperspectral line scan camera, the hyperspectral line scan camera being positioned so that the camera face of the prism is within an instantaneous field of view (IFOV) of the hyperspectral line scan camera;
a line illumination source, the illumination source being positioned so that the illumination source's projected illumination is reflected by the illumination face of the prism; and,
a nadir convergence scan line;
whereby as the prism rotates, the hyperspectral line scan camera IFOV and the projected illumination are directed by the rotating prism to converge at the nadir convergence scan line so that the hyperspectral line scan camera scans the nadir convergence scan line and collects line scan hyperspectral reflectance and fluorescence data.

2. The system of claim 1 wherein the system is structured so that as the prism rotates, the nadir convergence scan line sweeps across an inspection area, the hyperspectral line scan camera thereby gathering line scan hyperspectral reflectance and fluorescence data across the inspection area.

3. The system of claim 2 wherein the system is configured so that, during an operational inspection cycle, hyperspectral line scan data is gathered as the prism rotates the nadir convergence scan line from a beginning position to an ending position, and then the prism rotates in an opposite direction to move the nadir convergence scan line back from the ending position to the original beginning position, to thereby complete the operational inspection cycle, the operational inspection cycle being repeated until operation is terminated.

4. The system of claim 1 wherein the system further comprises:
a first angular reflective mirror disposed between the illumination source, and the illumination face of the prism, and
a second angular reflective mirror disposed between the hyperspectral line scan camera, and the camera face of the prism;
wherein the system is configured so that the illumination source and the hyperspectral line scan camera are positioned in tandem with the prism so that the system comprises a compact portable handheld device.

5. The system of claim 4 wherein the first angular reflective mirror reflects projected illumination about 90 degrees from the illumination source to the illumination face of the prism.

6. The system of claim 4 wherein the second angular mirror reflects the IFOV of the hyperspectral line scan camera about 90 degrees from the hyperspectral line scan camera to the camera face of the prism.

7. The system of claim 1 wherein the system is controlled by a controller, optionally a single-board controller.

8. The system of claim 7 wherein the controller directly controls a micromotor, the micromotor rotating the prism about a central axis.

9. The system of claim 7 wherein the controller controls a light emitting diode (LED) driver circuit, the LED driver circuit controlling adjacent LEDs.

10. The system of claim 9 wherein the LEDs comprise ultraviolet (UV) LEDs.

11. The system of claim 9 wherein light from the LEDs passes through a light-shaping diffuser to the illumination face of the prism.

12. The system of claim 1 wherein the line illumination source comprises an LED driver circuit, LEDs, and a light-shaping diffuser.

13. The system of claim 1 wherein the hyperspectral line scan camera comprises a wide-angle lens.

14. The system of claim 1 wherein the hyperspectral line scan camera comprises a solid block monolithic spectrograph.

15. The system of claim 1 wherein the hyperspectral line scan camera comprises a board-level complementary metal-oxide-semiconductor (CMOS) detector.

16. The system of claim 1 wherein the hyperspectral line scan camera comprises a wide angle lens fitted to a solid block monolithic spectrograph that is in communication with a board-level CMOS detector.

17. The system of claim 1 wherein the hyperspectral line scan camera comprises a wide angle lens fitted to a solid block monolithic spectrograph that is in communication with an electron-multiplying charge-coupled device camera.

18. The system of claim 1 wherein the hyperspectral line scan camera is in communication with a data processor for processing the line scan hyperspectral reflectance and fluorescence data.

19. The system of claim 1 wherein a user communicates with the system via a touchscreen display, the touch screen display being in communication with a controller and processor that direct functions of the system.

* * * * *